INVENTOR
F. P. Strother

April 24, 1962
F. P. STROTHER
3,030,853
METHOD AND APPARATUS FOR COUNTING
IMPERFECTIONS OF STRAND MATERIAL
Filed Feb. 24, 1954
2 Sheets-Sheet 2
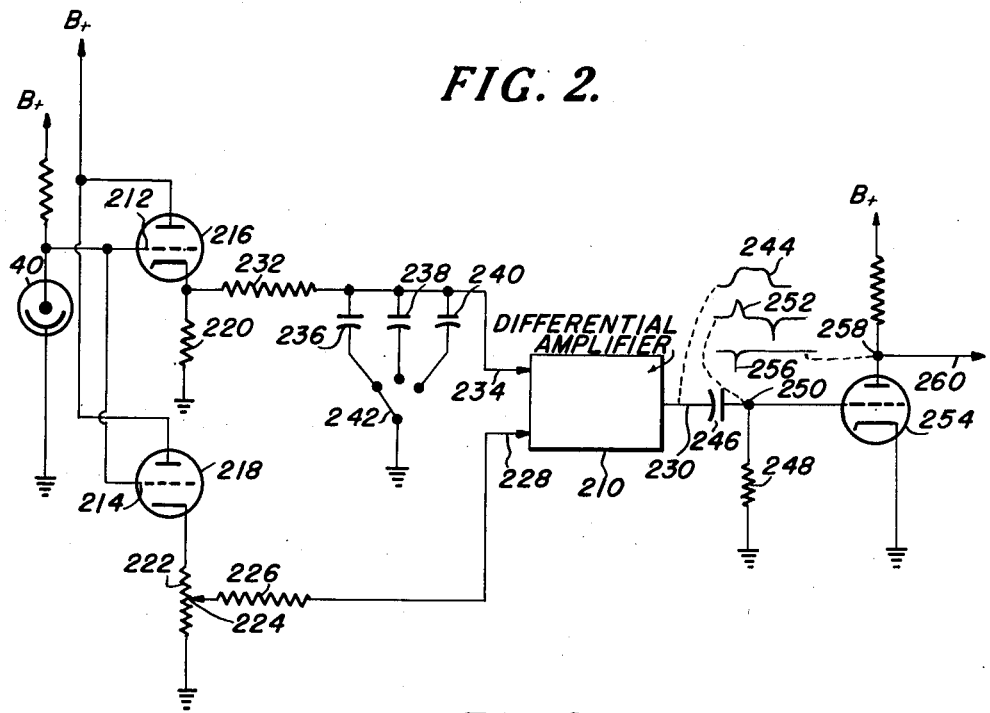
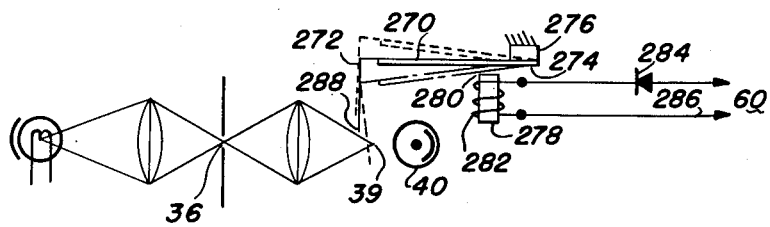
INVENTOR
F. P. Strother
BY Cushman, Darby & Cushman
ATTORNEYS

United States Patent Office 3,030,853
Patented Apr. 24, 1962

3,030,853
METHOD AND APPARATUS FOR COUNTING IMPERFECTIONS OF STRAND MATERIAL
Fred P. Strother, Shawmut, Ala., assignor, by mesne assignments, to West Point Manufacturing Company, West Point, Ga., a corporation of Georgia
Filed Feb. 24, 1954, Ser. No. 412,320
7 Claims. (Cl. 88—14)

This invention pertains to counting apparatus and particularly to apparatus for counting the occurrences of imperfections or the like in a travelling length of an article. The invention particularly pertains to apparatus for counting neps, imperfections or trash particles which may be present in any given sample of yarn.

Briefly stated, the invention provides a physical count of particles and imperfections as above stated, and includes calibration means as an important aspect thereof. The calibration means permits an operator to calibrate the apparatus from a light input section to select the minimum size particle or imperfection which is to be counted. The invention further includes means for distinguishing between gradual changes in the size of yarn and the like, and abrupt changes which are characteristic of the type of particle imperfections or the like which it is desired to count. An arrangement may be provided as a feature of the invention, to move the material being analyzed at a constant speed, and a count recorded for a predetermined time interval.

It is a primary object of this invention to provide an improved counting apparatus, particularly for counting neps, imperfections or trash particles in yarn or the like.

It is a further object of the invention to provide counting apparatus as above stated including means for making the apparatus responsive only to predetermined size particles or imperfections.

It is a further object of the invention to provide a counting apparatus as hereinabove characterized, in which gradual changes in size of material may be distinguished from more abrupt changes resulting from characteristics which it is desired to count.

It is a further object of the invention to provide for counting imperfections or the like for predetermined periods of time.

It is a further object of the invention to provide calibration means for the apparatus as hereinbefore described.

Further objects and the entire scope of the invention will become more fully apparent in the following detailed description and in the appended claims.

The invention may be best understood with reference to the accompanying drawings wherein:

FIGURE 2 shows another embodiment of the invention, and

FIGURE 3 shows a calibration device for use with the invention.

Figure 1:
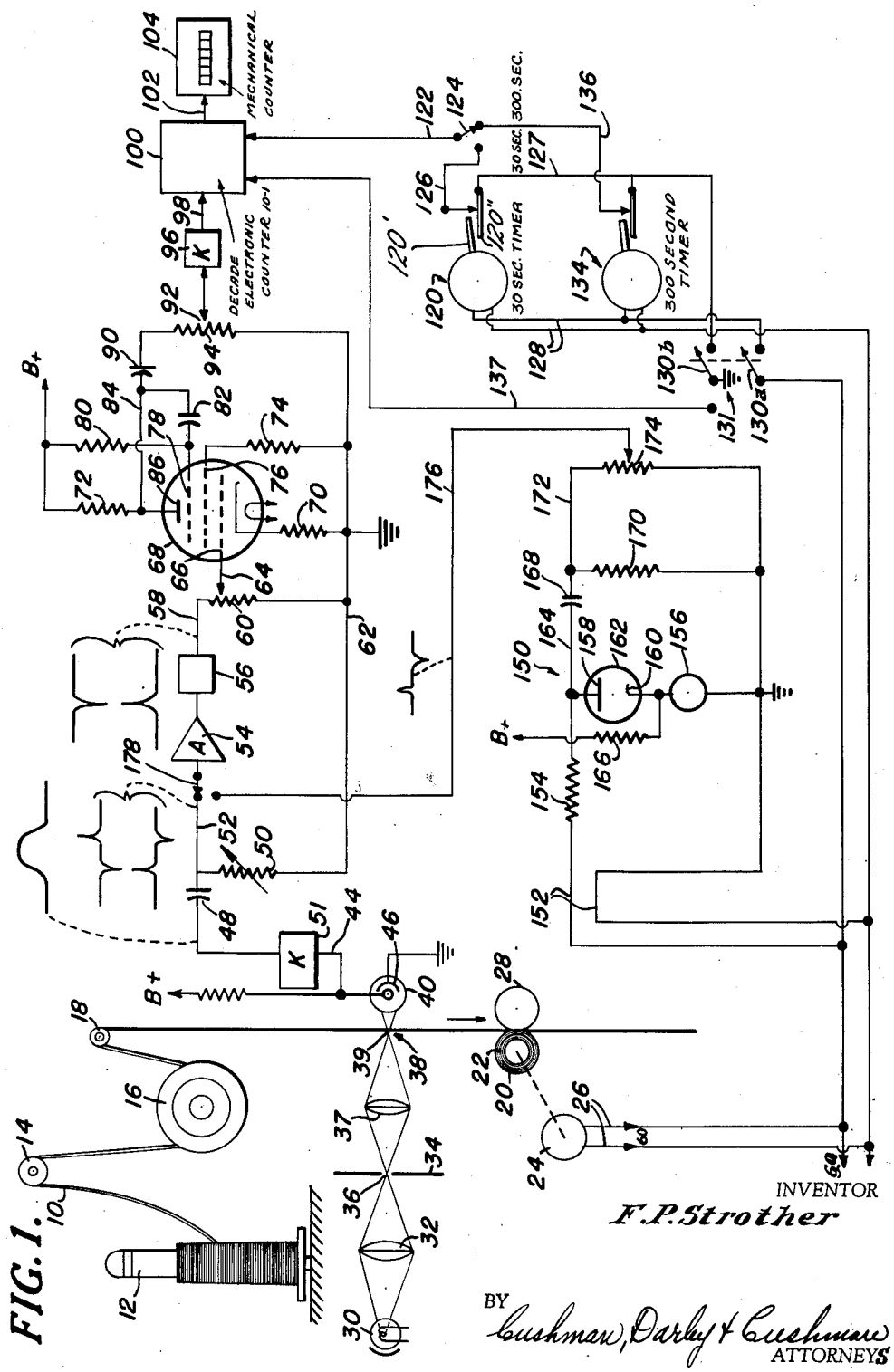
FIGURE 1 shows exemplary apparatus and circuitry according to the invention.

Referring now to FIGURE 1 reference character 10 designates a length of yarn or the like to be tested. Yarn 10 is drawn from spindle 12 over a smooth post 14, between friction discs 16 and over post 18 by a roller 20 having a resilient covering 22. Roller 20 is driven clockwise as viewed in FIGURE 1 by a synchronous motor 24 connected to power supply lines 26 presenting voltage of constant frequency, say 60 cycles per second. Resilient covering 22 of roller 20 bears firmly against idler roller 28. Thus operation of motor 24 causes yarn 10 to move downwardly as viewed in FIGURE 1 at a uniform rate of speed.

Light from a constant source 30 is passed through a suitable lens 32 and focussed onto a mask 34 having an elongated but narrow slit 36 therein. The image of slit 36 is focussed by lens 37 at position 38 whereat a ribbon of light 39 is formed. The light then impinges upon a photoelectric cell 40. The mask 34 is so positioned that the slit 36 and therefore light ribbon 39 intersects the path of yarn 10 at position 38. The plane of the light ribbon 39 is preferably perpendicular to the direction of yarn 10 and the yarn normally passes through the center of the ribbon. Thus sidewise movement of the yarn does not change the total amount of light passing from slit 36 to photoelectric cell 40.

At this point, it will be understood that the amount of light reaching photoelectric cell 40 is dependent upon the amount of light absorbed or blocked by the particular incremental length of the yarn 10 which intersects the light ribbon 39. An intense ribbon of light is preferred. As the light blocking characteristic of the yarn changes as it moves past the light ribbon, the varying amounts of light reaching the photoelectric cell will cause a corresponding fluctuation in voltage on line 44 connected to the photo cathode 46 of photoelectric tube 40. The thinness, or vertical dimension of the ribbon 39 as shown in FIGURE 1, determines the detail which may be measured. That is, with a light ribbon of approximately 5/1000 of an inch, correspondingly small particles or imperfections in the yarn may be detected as it passes through the light ribbon.

It is desired to eventually count only the occurrence of fairly abrupt imperfections, and to avoid response of the circuitry to gradual changes in the cross-section or light absorption properties of the yarn or whatever other material is being used. Therefore, the fluctuating signals on line 44 may be differentiated by use of condenser 48 and resistor 50, preferably preceded by a cathode follower circuit 51 to adjust the impedance level. Thus, a relatively sharp "spike" will be formed as indicated in a first direction usually followed by a spike in the opposite direction, designating the departure from and return to a reference voltage on line 44.

Signals on line 52 may be amplified in any conventional amplification circuits 54 and either the negative or positive spikes removed in clipping circuit 56 (or in the amplifier) so as to permit on line 58 but one spike for each imperfection which is detected. A resistor 60 is provided between line 58 and line 62 connected to a suitable ground. Those skilled in the art will appreciate that slow changes in voltage on line 44 will not produce spikes or at least will not do so above predetermined limits of amplitude.

Adjustable tap 64 connects with resistor 60 and also to a control grid 66 of a vacuum tube 68. For example, this may be a type 6BN6 tube. Tube 68 is connected in an amplification circuit such that only voltages appearing in a relatively narrow amplitude range are amplified. For example, the tube may be operated so it will not amplify any incoming voltage with the value of less than one volt, will produce essentially linear amplification voltages from 1 to 1.1 volts and for any greater value the 1.1 volts in output signal will not increase. Thus there is provided not only an amplifier, but also a clipper and limiter. This type of amplification is provided by connecting a resistor 70 in the cathode circuit and resistor 72 in the anode circuit. Resistor 74 may be connected to a grid 76 and the remaining grid 78 may be connected to the source of B by resistor 80, all as will be well understood by those skilled in the art. Additionally, feedback may be coupled into the condenser 82 connected by the grid 78 and line 84 connected to the anode 86.

By adjustment of tap 64 to resistor 60, the amplification circuit as just described can be made insensitive to small variations and roughness in the yarn, as desired. That is, spikes of predetermined or less amplitude on line 52 may be rejected, even if produced by abrupt changes.

The feedback circuit serves to produce essentially only pulses in the output circuit.

The signals on line 84 may be coupled through condenser 90 and tap 92 of resistor 94 to an amplification circuit 96, preferably a cathode follower circuit to adjust the impedance level. From circuit 96 amplified pulses are connected over line 98 as the input to an electronic counter circuit 100. For example, this may be any one of several well known counting circuits, and may be for example a decade counter. In other words, it will produce a count down in the ratio of 10 input pulses to one output pulse, the latter being available on line 102. Line 102 is connected as an input to a solenoid-operated mechanical counter 104, there being several well known counters available on the commercial market for this purpose. The decade counter 100 may be provided with the usual neon lights for indicating the instantaneous count. Counter 104 will register once for every ten input pulses to the counter 100, and intermediate counts may be observed by the indication of counter 100.

The provision of the electronic counter 100 is an important feature of the invention. The electronic counter will handle two pulses spaced very close together, and will count at a greater repetition rate than is possible with the mechanical counter.

At this point it will be apparent that for each abrupt change in the characteristic of the yarn as it intersects the light ribbon 39, signals will be available on lines 44, 52, etc. By adjustment of resistor 50 the differentiating effect of this resistor and capacitor 48 may be varied to vary the response of the circuit in relation to the abruptness of the change of characteristic. Expecting oppositely directed spikes to occur on line 52 whenever an imperfection is detected, one or the other overshoot may be clipped at circuit 56 and thus one signal remains for energization of the counters 100 and 104, for every imperfection.

To provide a count in relation to a unit of length of the yarn 10, the counter 100 is energized for a measured period of time. Any predetermined period of time may be used and provision for a 30 second and a 300 second interval is shown. 30 second timer-switch 120 may be selected for energizing counter 100 over line 122 by operation of switch 124 to connect the output line 126 of timer-switch 120 to enable the counter 100. Many convenient ways of energizing and deenergizing counter 100 over line 122 will be well known to those skilled in the art, and it is thought unnecessary to describe same at this point.

The timer-switch 120 may be any conventional device of this type, operated at a given speed by connection to power leads 128 presenting a voltage of predetermined frequency, say 60 cycles per second. Closing of switch arm 130a of switch 131 will cause timer-switch 120 to operate to cause lever 120' to move switch contact 120" to alter a biasing potential on line 126 established by connection over line 127 to ground through switch arm 130b of switch 131 at the end of the 30 second period. At this moment the lever 120' will have moved from a reset position to engage the switch arm 120". When it is considered that motor 24 moves yarn 10 at a constant predetermined rate of speed, related to the timer through the 60 cycle source or otherwise, a count for a 30 second interval is immediately related to the number of imperfections per unit length.

A 300 second interval—or any other desired interval—may be similarly established by operation of a 300 second timer-switch 134. This may be employed as is timer-switch 120 by moving switch 124 to connect line 122 to output line 136 of timer-switch 134.

Switch 131 is double pole double throw insofar as arm 130b is concerned. Thus, at the end of an operation, switch 131 may be moved to connect counter reset line 137 to ground through arm 130b.

Release of the power circuit at switch 131 will permit the timer-switch levers to reset.

As one arrangement for calibrating the apparatus, a calibration circuit designated generally as 150 is provided. A voltage of standard frequency, say 60 cycles per second, available on power lines 152, is presented through the resistor 154 to anode 158 and through voltage regulator tube 156 to the cathode 160, respectively, of a diode tube 162. Diode 162 tends to rectify the alternating voltage to provide alternate half waves on line 164 connected with anode 158. Voltage regulator tube 156, which may have a maximum 90 volt drop, serves to clip off the top of the wave on line 164 always at the predetermined voltage above ground. The regulator tube is supplied through resistor 166 from a source of B.

The clipped voltage wave is passed through a differentiation network comprising capacitor 168 and resistor 170 to provide on line 172 spikes of known value. Line 172 is connected to a calibration resistor 174 of high accuracy. For example, this may be an adjustable resistor known as a Helipot. This type of device may be accurately set and has a linearity better than 1%. The resistor 174 may be equipped with a vernier dial (not shown) to permit an adjustment with high resettable accuracy. Thus, any desired calibrating voltage from zero to the maximum delivered by the differentiating circuit on line 174 may be obtained. The spikes on line 172 are thus obtained at desired attenuation on line 176 which may be connected to previously mentioned amplifier 54 by movement of switch 178 to connect the input amplifier 54 to line 176 instead of line 152.

At this point it will be apparent that, once having determined the spike amplitude necessary to count a given size imperfection, it is possible to adjust the calibrating resistor 174 to such a value that when it is connected to the amplifier 54, the individual cycles of alternating current should be counted. If not, the main circuit may be adjusted as required to provide a proper response.

It will now be assumed that yarn moved at 5 feet per second by roller 20 for 30 seconds will equal 150 feet; or 300 seconds will equal 1,500 feet. Thus, as the electronic counter circuit 100 presents the tens digit of the count electronically and the other digits appear on the mechanical counter 104, there may be secured the available number of imperfections per 150 feet of yarn, by taking the reading of the mechanical counter and the tens digit shown on the electronic counter.

It will be apparent that the time constants of the differentiating circuits may be varied so that the apparatus will count imperfections of different types. Using textile industry terminology, the apparatus may be caused to count slubs instead of neps and trash particles.

As has been hereinabove indicated, the nature of the circuits described causes the apparatus to be responsive only to fairly abrupt changes in yarn imperfection and more gradual changes in the characteristic of the yarn do not result in actuation of the counters. FIGURE 2 shows modified circuits for accomplishing this same purpose. In FIGURE 2 the output of the photocell 40 (corresponding to photocell 40 in FIGURE 1) is presented to a difference amplifier 210 over two separate paths, one having an integrating function. In greater detail, the anode of photocell 40 is connected to control grids 212 and 214 of vacuum tubes 216 and 218 respectively. Tubes 216 and 218 are operated as cathode followers, with voltage fluctuations corresponding to those on the grids appearing across cathode resistor 220 for tube 216 and across cathode resistor 222 for tube 218. These voltages will be related due to the direct interconnection of the grids 212 and 214 to the anode of photocell 40. The voltage across resistor 222 is tapped at point 224 and coupled through resistor 226 to one input line 228 of the differential amplifier 210.

Difference amplifiers are well known in the art and are circuits usually involving two vacuum tube sections so interconnected that on output line 230 there appear only signals representing the difference in the input signals. It is thought unnecessary to describe a differential amplifier circuit in detail in this specification because of the familiarity of these circuits with those skilled in the art. The circuits are also fully analyzed, for example, in Electronics; Experimental Techniques, Elmore and Sands, McGraw-Hill, 1949, and volume 18, Radiation Laboratory Series, McGraw-Hill, 1948.

The voltage across cathode follower resistor 220 is coupled through resistor 232 to the second input line 234 of the differential amplifier 210. However, following the resistor 232, there are connected capacitive devices to ground. For purposes of illustration, three condensers 236, 238 and 240 are provided with switch 242 available for selecting one of the condensers for use. It will be observed that resistor 232 and whichever of the condensers is connected to ground through switch 242 will provide an integration circuit. Such circuit will have the function of attenuating all abrupt changes in the photocell voltage fluctuations. However, there being no integration or attenuation function associated with the first input 228 of the differential amplifier, the voltage fluctuations at this input will faithfully follow the fluctuations generated in the photocell 40. The degree to which abrupt changes in voltage derived from photocell 40 will create a difference between inputs 228 and 234 of the differential amplifier will depend upon the capacitor to ground in the second input. Selectivity is thus provided by any arrangement such as that shown wherein the capacitors 236, 238 and 240 may be of differing values. It will now be appreciated that gradual changes in the yarn, such as appearance of so-called slubs rather than neps or trash particles will result in a difference input. On line 230 a difference signal may be as indicated by the line 244. Some difference amplifier circuits will produce at this point a sharp unidirectional pulse regardless of the difference waveform which was applied. However, in the general case, a capacitor 246 and resistor 248 may be provided as a differentiation circuit. Thus, differential spikes will appear at junction 250 as illustrated by line 252. A stage of amplification and clipping may be connected to tube 254 for removing the spikes of one polarity. This action leaves only the spikes in one direction; one for every imperfection, as shown by line 256 which designates the waveform at junction 258 in the anode circuit of tube 254. The voltage at junction 258, a positive going pulse by reason of the inversion in tube 254, may be applied over line 260 to counting means such as shown in FIGURE 1, being inverted as may be necessary.

The circuit of FIGURE 2 may be adjusted for responce to different size particles of like abruptness, by adjusting variable resistor 222. This may be a high accuracy rheostat, such as a Helipot.

A preferred type of calibration will now be described with reference to FIGURE 3. This calibration procedure is usable with either the embodiments of FIGURE 1 or 2 as hereinabove described. A flexible arm 270 having a length of piano wire or the like 272 thereon is mounted at 274 on a suitable fixed support 276. The arm 270 is magnetically attractible and a magnetically permeable core 278 is provided in proximity thereto at point 280. A coil 282 is wound about core 278 and supplied with unidirectional pulses of current by rectification in device 284 of alternating current supply over leads 286. The arrangement is such that the arm 270 and wire 272 are driven at a predetermined frequency, say 60 cycles per second, where the frequency of the current on line 286 is 60 cycles per second. The end 288 of wire 272 is at rest position just out of the beam of light which forms the light ribbon 39 whereat the yarn 10 passes through. Energization of winding 282 by operation of any convenient switch (not shown) will cause the arm 270 and wire 272 to vibrate so that the wire 272 intermittently penetrates and passes through the total amount of light which forms the ribbon 39. Preferably the intersection of the vibrating wire with the light beam is at a point somewhat out of the main focal point. The point of intersection may be anywhere in the light path. Preferably, however, it is between the point and any optical means or mask, etc., so as to compensate for collection of dust or the like thereon. Depending upon the intensity of light and the diameter of the wire 272, the repeated interception of light by the wire 272 will produce fluctuations of predetermined amplitude in the light reaching the photocell 40. The diameter of the wire 272 can be caused to be related to neps or other imperfections of predetermined size occurring in a yarn or the like. Thus, the entire circuitry may be immediately calibrated to respond in a desired manner to the simulated imperfections created by the wire 272 vibrating into and out of the light path. It will be observed that the calibration thus encompasses changes in the intensity of the light source, any dust on the lenses or at the mask aperture 36 causing reduction in light reaching the photocell 40, any changes in the characteristics of the photocell 40, etc.

In using either the just described calibration system or the calibration system described specifically in connection with FIGURE 1, it will be apparent that a calibration of the counters may be obtained by operation of the timing circuits as described in connection with FIGURE 1. That is, where the wire 272 vibrates at 60 cycles per second, which is the repetition rate of the calibration spikes in circuit 150 of FIGURE 1, operation of the 30 second timer should show a count of 1,800 in the counters, and a corresponding count for the 300 second timer.

The foregoing description of detailed embodiments of the invention has been given only for purposes of illustration and the scope of the invention is to be determined from the appended claims.

What is claimed is:

1. Apparatus for detecting the occurrence of imperfections or the like of predetermined abruptness in strand material comprising, means for scanning along the strand material with a beam of light of uniform intensity which at all times surrounds the strand, light sensitive means for producing a voltage proportional to the amount of light reaching the light sensitive means as the strand material is scanned, and a circuit having differentiation properties for producing at an output thereof a voltage pulse in response only to predetermined and greater rates of change of the voltage derived from the light sensitive means.

2. Apparatus for detecting the occurrence of imperfections or the like of predetermined abruptness in strand material comprising, means for scanning along the strand material with a beam of light of uniform intensity which surrounds the strand, light sensitive means for producing a voltage proportional to the amount of light reaching the light sensitive means as the strand material is scanned, and a circuit having differentiation properties for producing at an output thereof a voltage pulse in response only to predetermined and greater rates of change of the voltage derived from the light sensitive means, the apparatus further including circuit means for suppressing outputs from the differentiation circuits of less than a predetermined amplitude.

3. Apparatus for detecting the occurrence of imperfections or the like of predetermined abruptness in strand material comprising, means for scanning along the strand material with a beam of light of uniform intensity which surrounds the strand, light sensitive means for producing a voltage propertional to the amount of light reaching the light sensitive means as the strand material is scanned, and a circuit having differentiation properties for producing at an output thereof a voltage pulse in response only to predetermined and greater rates of change of the voltage derived from the light sensitive means, the apparatus further including a difference circuit having two inputs and an output whereat any difference between input signals will appear, two connection channels extending between the light sensitive means and the respective inputs of the difference circuit, one of said channels including means for increasing the attenuation of signals of a rate of change above a predetermined value with respect to the attenuation of corresponding signals in the other channel, the arrangement being such that rates of change of responsiveness of the light sensitive means below said predetermined value will not result in a difference signal.

4. In apparatus for detecting the occurrences of imperfections or the like of predetermined abruptness in strand material, which apparatus includes means for scanning along the strand material with a beam of light of uniform intensity intercepted by said strand and further includes light sensitive means for producing a voltage proportional to the amount of light reaching the light sensitive means and further includes differentiation means for determining the rate of change of the amount of light reaching the light sensitive means, a calibration means for said apparatus, the calibration means comprising test means of predetermined cross-section for intercepting the light beam, including means for moving the interception means into and out of the light beam at a predetermined repetitive rate, and means for adjusting the output of the apparatus at a predetermined level while said interception means is moving into and out of the light beam as aforesaid, whereby the apparatus is calibrated as to responsiveness to rate of change.

5. Apparatus as in claim 4 wherein the interception means is positioned to intercept the light beam in the vicinity of the path of the strand through said beam to thereby compensate for any modification of the anticipated amount of light at said strand-path intersection.

6. A method for detecting the occurrences of imperfections or the like of predetermined abruptness in strand material comprising the steps of scanning along the strand lengthwise thereof to generate voltages instantaneously proportional to the instantaneous size of the strand, and subjecting the generated voltages to time derivative action to provide signals for distinguishing between changes of given abruptness and others of more gradual change in strand configuration.

7. Apparatus for detecting the occurrences of changes of predetermined abruptness in the cross-sectional configuration of a length of material comprising means for scanning along the length of the material to generate signals instantaneously proportional to said configuration, means for taking the time derivative of said signals, and means for indicating the occurrences of derivative signals only of predetermined magnitudes.

References Cited in the file of this patent

UNITED STATES PATENTS

| | | |
|---|---|---|
| 2,037,044 | Reinartz et al. | Apr. 14, 1936 |
| 2,413,486 | Denyssen | Dec. 31, 1946 |
| 2,641,960 | Strother | June 16, 1953 |
| 2,659,823 | Vossberg | Nov. 17, 1953 |
| 2,665,846 | Gilbert | Jan. 12, 1954 |
| 2,731,202 | Pike | June 17, 1956 |
| 2,774,940 | Bernet | Dec. 18, 1956 |

OTHER REFERENCES

Burgwin: Electronic Regulation of Industrial Processes, "Instruments," vol. 17, June 1944, pp. 328–330 and 369. (Copy in U.S. Patent Office Library.)

Ryder: "Electronic Fundamentals and Application," pages 569–572, 1950.